Figure 1:
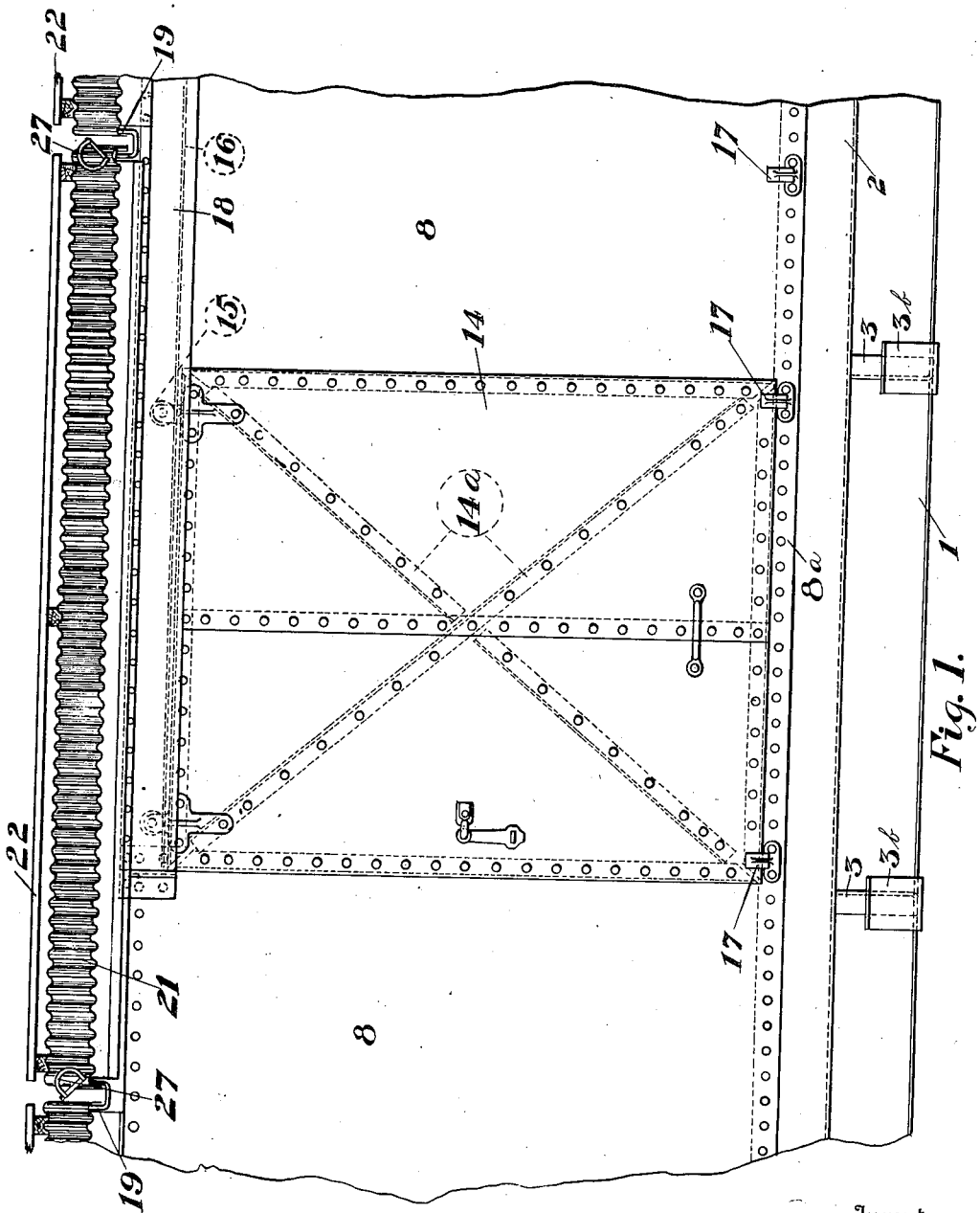

M. C. BLEST.
BOX CAR.
APPLICATION FILED MAR. 3, 1908.

903,438.

Patented Nov. 10, 1908.

6 SHEETS—SHEET 2.

Witnesses
Frank C. Miller
Roy C. Munro

Inventor
Minot C. Blest
By Harry A. Knight
Attorney

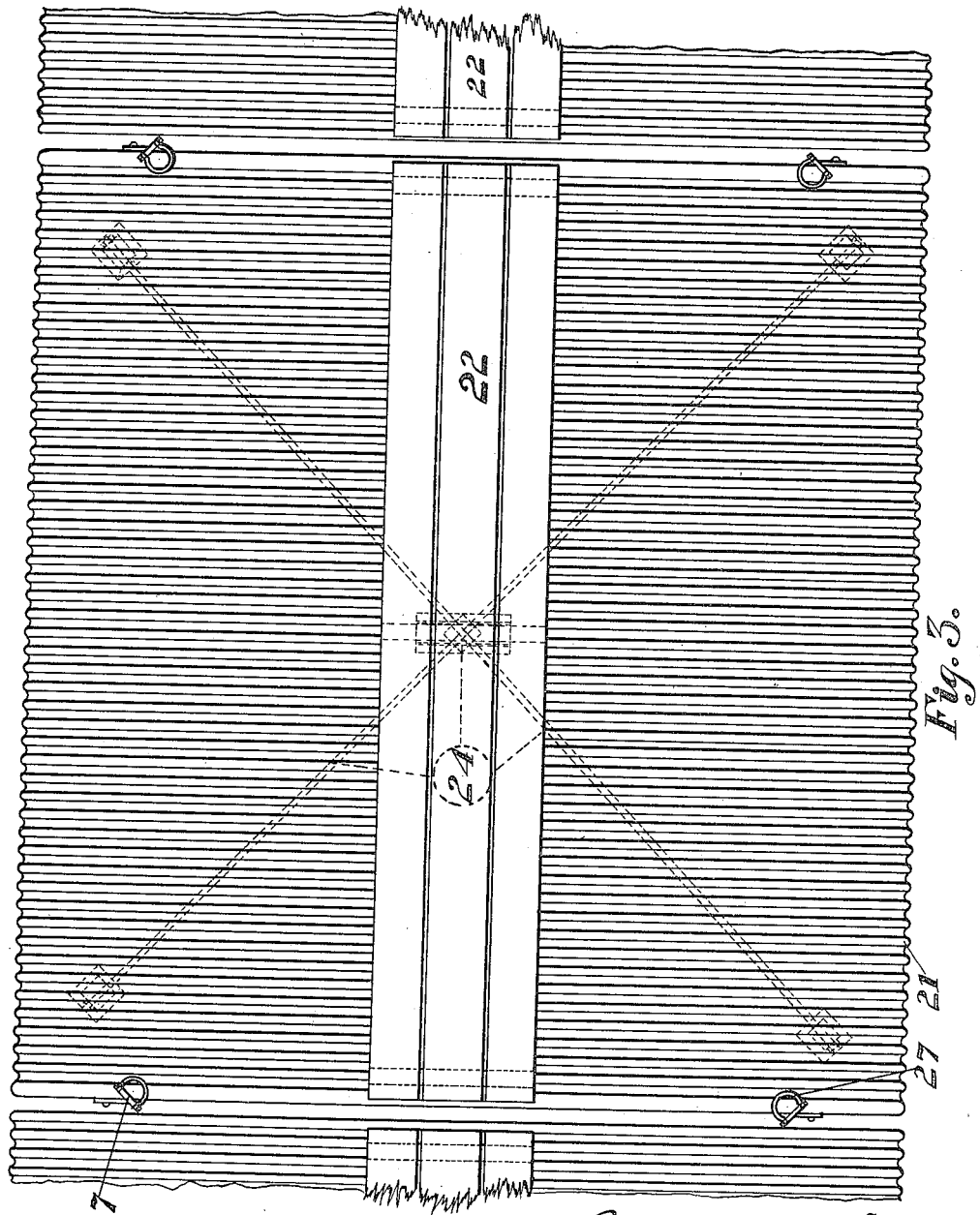

M. C. BLEST.
BOX CAR.
APPLICATION FILED MAR. 3, 1908.

903,438.

Patented Nov. 10, 1908.

6 SHEETS—SHEET 4.

Witnesses
Frank C. Miller
Roy. C. Munro

Inventor
Minot C. Blest
By Harry A. Knight
Attorney

M. C. BLEST.
BOX CAR.
APPLICATION FILED MAR. 3, 1908.
903,438.
Patented Nov. 10, 1908.
6 SHEETS—SHEET 5.
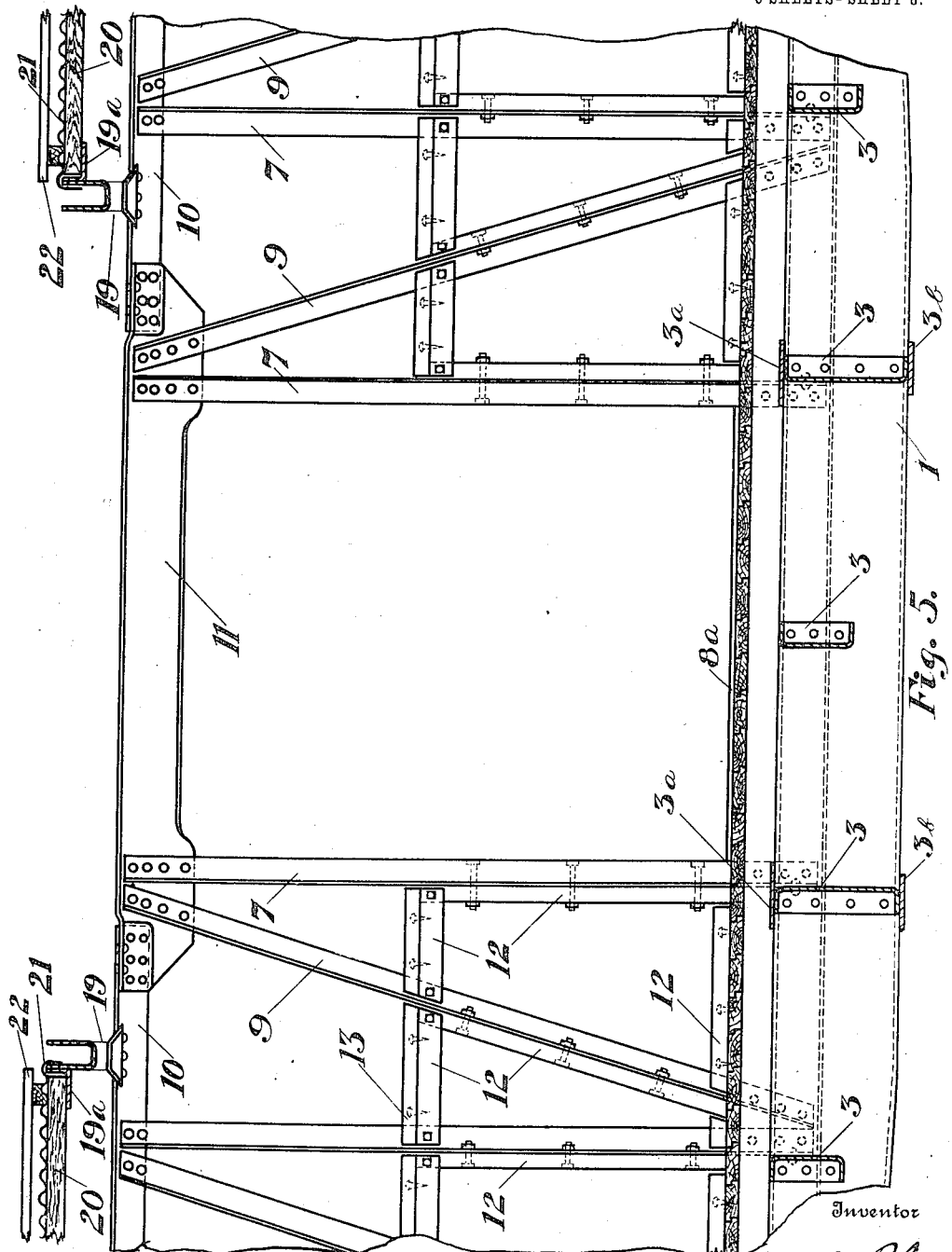

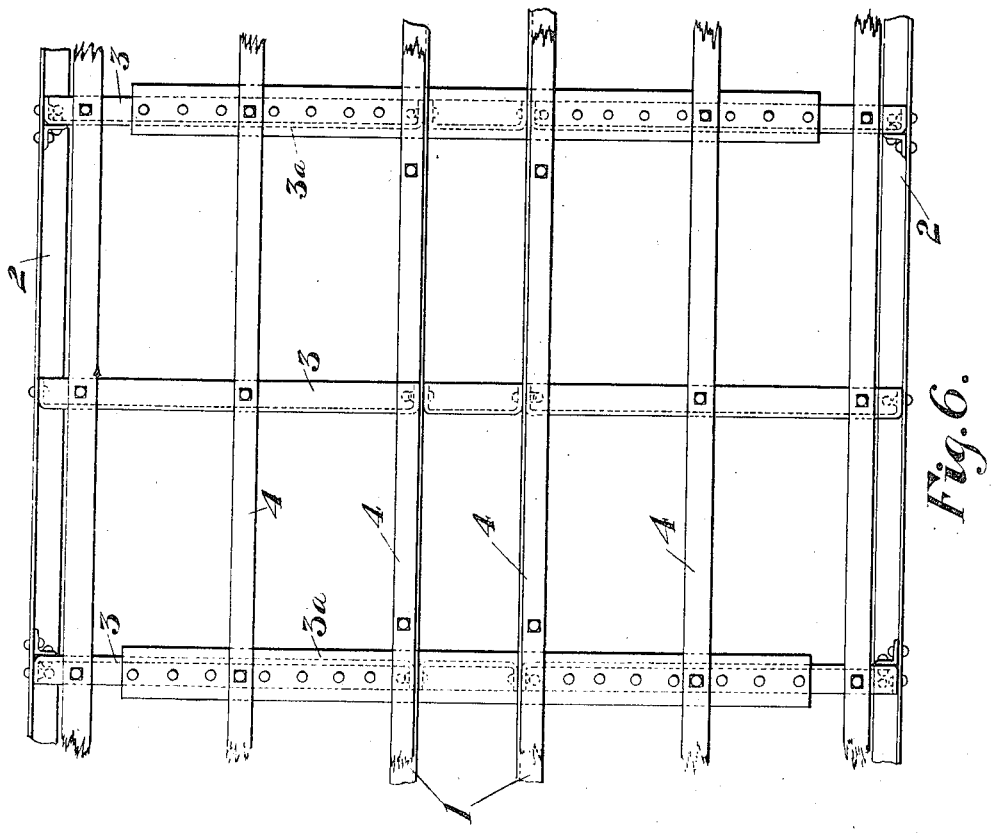

UNITED STATES PATENT OFFICE.

MINOT C. BLEST, OF BELLEVUE, PENNSYLVANIA, ASSIGNOR TO PRESSED STEEL CAR COMPANY, OF PITTSBURG, PENNSYLVANIA, A CORPORATION OF NEW JERSEY.

BOX-CAR.

No. 903,438.	Specification of Letters Patent.	Patented Nov. 10, 1908.

Application filed March 3, 1908. Serial No. 418,972.

*To all whom it may concern:*

Be it known that I, MINOT C. BLEST, a citizen of the United States, and resident of Bellevue, Allegheny county, Pennsylvania, have invented certain new and useful Improvements in Box-Cars, of which the following is a full, clear, and exact description, reference being had to the accompanying drawings, in which like reference characters refer to like parts, and in which—

Figure 2:
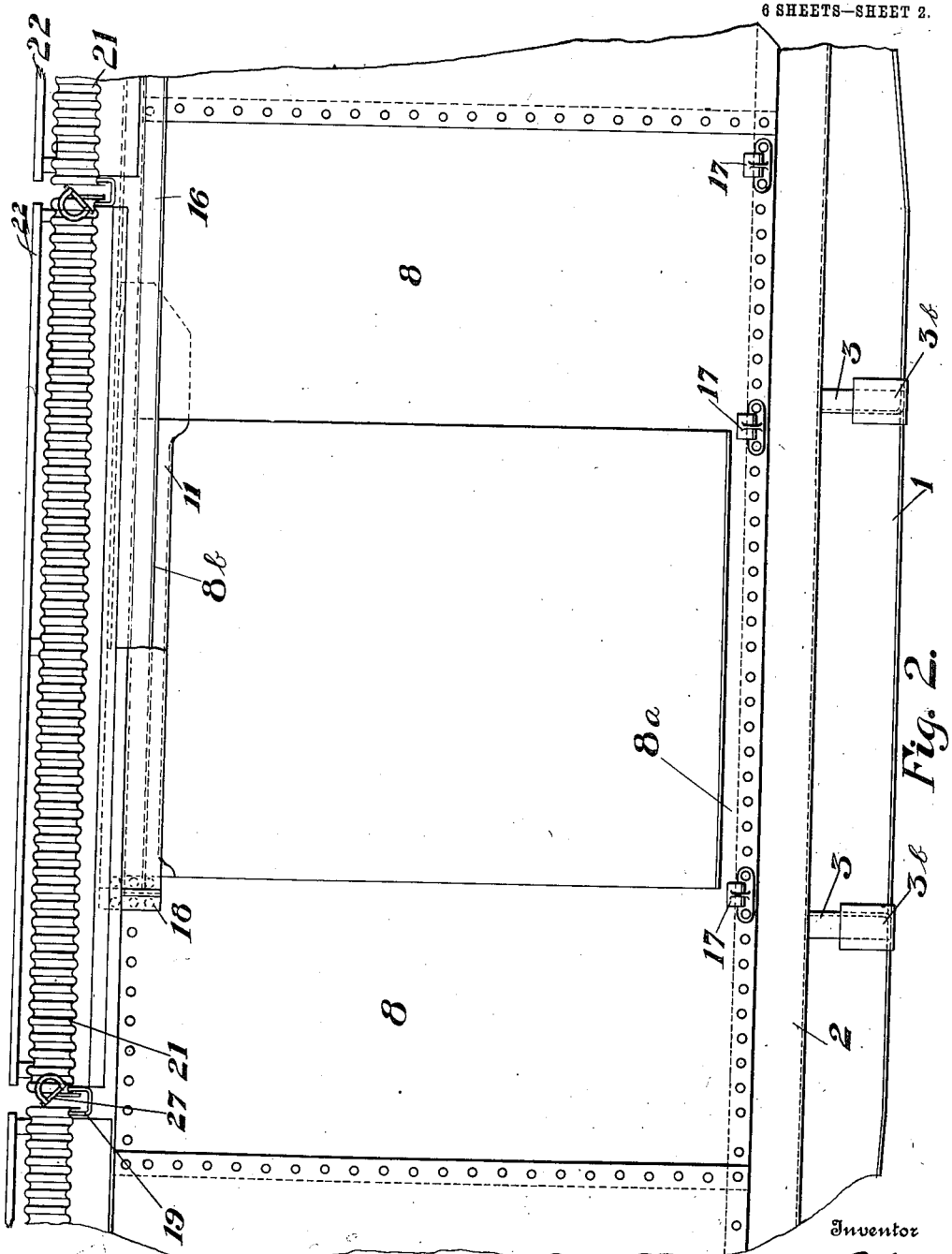
Figure 4:
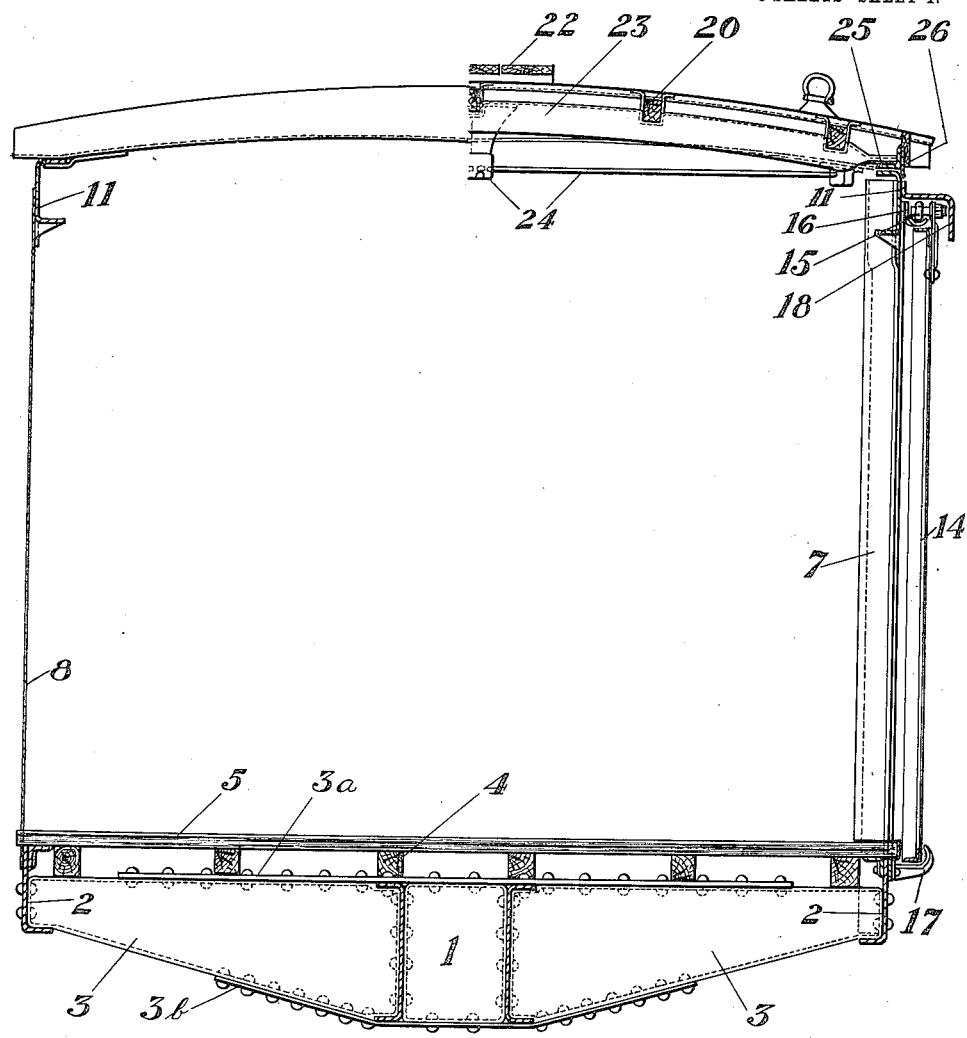
Figure 3A:
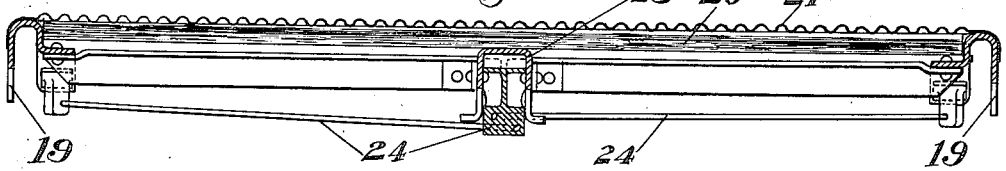

Figure 1 is a side elevation of the central portion of a box car constructed in accordance with my invention; Fig. 2 is a like view with the car door and a portion of the door hood removed; Fig. 3 is a plan view of the same; Fig. 3ª is a longitudinal section through the roof hatch; Fig. 4 is a transverse section through the central portion of the car, many of the details of construction being omitted on one side of the view; Fig. 5 is a longitudinal section through the central portion of the car showing the side framing in elevation; and Fig. 6 is a plan view of the central portion of the car underframe.

An object of the present invention is to provide a box car, preferably of all-metal type, having a liftable roof section or door, preferably centrally located in the length of the car.

Another object of the present invention is to provide a frame suitable for this form of car, said frame involving a special construction of car doorway.

Referring now in detail to the drawings, 1 represents the center sills, 2 the side sills, 3 the cross beams, bolsters or transoms in the car underframe, of suitable depth depending upon their location and the peculiar stresses to be resisted by them. To stiffen the central portion of the car underframe one or more of the beams 3 may be provided with upper or lower, or both upper and lower tie plates 3ª—3ᵇ.

4 are stringers bolted to the underframe and extending longitudinally of the car to which the flooring 5 is secured.

7 are vertical side or end posts of suitable number and location around the side and end of the car and to which sheeting 8 is riveted.

9 represents diagonal braces also of suitable number and location around the walls of the car. Posts 7 are in the same vertical plane as the side sill or the end sill of the car, depending upon their location; they are offset at their lower ends and secured to the inner faces of said sills. Sheeting 8 is riveted to one of the flanges of each of the posts 7 which flange is in the same vertical plane as the outer face of the side or end sill, depending upon the location of the sheeting. Sheeting 8 is also riveted to the outer face of the side or end sill. Although this is not shown in connection with the car end the same method of securing sheeting at the lower end is pursued as on the sides of the car.

10 are side plates of the car supported by posts 7 and braces 9, both of which are riveted at their upper ends to side plates 10 and at their lower ends to the side sills 2.

There are two doorways, one on each side of the car and formed by spacing a pair of posts a suitable distance apart.

11 is a metal lintel, channel-shaped in cross-section, with flattened lower-end edges. There is one lintel for each doorway. Each lintel 11 is riveted at its ends to adjacent side plates 10, between which plates 10 it forms a connecting link. Each lintel 11 is furthermore riveted to the upper ends of one or more posts 7 or one or more braces 9, or both braces 9 and posts 7.

12 are wooden strips bolted to posts 7 or braces 9 to which the car lining (not shown) is to be nailed.

13 are wooden blocks or strips, angular in shape, nailed or secured to horizontal strips 12, and each of which acts as a shedding surface to prevent the accumulation of lading on strips or blocks 12 when the car is used for grain or other small lading.

8ª is a narrow door sill plate riveted to the side sill 2. The sheeting 8 is likewise riveted to the side sill 2 and each sheet to its adjacent sheet.

14 is a door, of metal plates, braced by diagonal braces 14ª. Door 14 is hung on rollers 15 traveling on a pressed metal track 16 riveted to the sheeting 8, to the side plates 10 and lintel 11. Track 16 extends a suitable distance to permit the door 14 to be thrown to the side of the doorway.

17 are guides riveted to the sheeting 8 and side sills 2, each serving to prevent the door 14 from flying out from the side of the car.

18 is a door hood located above the rollers 15 and extending a suitable distance along the side of the car over the track 16.

19 are carlines, U-shaped in cross-section, and extending from side plate to side plate across the car; there being preferably one of these carlines on each side of the doorways. In addition to the carlines 19, the car is provided with suitable carlines between the carlines 19 and the ends of the car which support purlins 20 on which is spread corrugated sheet metal roofing 21 and which also carry running boards 22. Each of the carlines 19 is provided with bracket angles 19$^a$ projecting toward the ends of the car, each in line with a purlin 20, which support the ends of the purlins 20 extending toward the ends of the car, at the hatchway or central opening of the car roof.

The hatchway or central liftable roof section is constructed of corrugated sheet metal roofing 21, projecting at each end to form a supporting hook adapted to engage carlines 19 and mounted on purlins 20, carried by one or more carlines 23 having suitable transverse seats therein to receive the purlins 20. The hooked ends of the roofing 21 also prevent longitudinal displacement and form weatherproof closures for the hatch. The hatch or central liftable roof section is also provided with a running board 22 in line with the running boards 22 extending over the balance of the car. The hatch or central liftable roof section is furthermore braced by diagonal trusses 24 extending transverse the car from one corner of the hatch to the other (Figs. 3 and 3$^a$). The hatch or central liftable roof section is furthermore provided with a face angle 25 extending full length along the side of said hatch and carrying a face plate 26 and to which is secured the carlines 23 (Fig. 4). Finally, the central liftable roof section or hatch is provided with lifting or attaching eyelets 27 through means of which it may be lifted from its position over the hatchway.

The form of lintel herein shown and described being of greater depth than the side plates of a suitable shape in cross-section compensates for the loss of strength in the car side due to the door opening and the lack of continuity in the roof. The tie plates 3$^a$ and 3$^b$ serve the same purpose.

If desired, the entire roof of the car may be made removable, in a manner described in connection with the centrally located hatch. This would involve merely the location, at each end of the car, of a carline 19 and use of hatches such as described.

Having thus described my invention, the following is what I claim as new therein and desire to secure by Letters Patent:

1. A car having a wall with an opening therein, a side plate and a pressed metal lintel over said opening connected to and forming a continuation of said side plate.

2. A car having a wall with an opening therein, and a channel-shaped lintel over said opening having flattened lower end edges.

3. A car having a wall with an opening therein and a lintel above said opening having an upper flange extending throughout its length and a lower flange extending a portion of its length.

4. A car having a wall with an opening therein, a side plate and a lintel over said opening offset at its ends to overlap said side plate, said lintel and side plate being riveted together.

5. A car having a wall with an opening therein, side plates and a lintel over said opening having offset ends overlapping the ends of said side plates and riveted thereto.

6. A car having a wall with an opening therein, side plates and posts on each side of said opening, oppositely disposed diagonal braces on each side of said opening and a lintel above said opening riveted to the ends of said side plates, said braces and said posts.

7. A car having a wall with an opening therein, spaced side plates with inwardly projecting flanges, a lintel having upper and lower inwardly projecting flanges and extending in line with the ends of said side plates and at its ends overlapping and riveted to the ends of said side plates.

8. A car having a wall with an opening therein, a lintel above said opening and side plates in axial alinement with said lintel.

9. A car comprising a carline, angles supported by said carline and a roof section supported by said angles and formed at its end to engage said carline.

10. A car comprising a roof section with purlins and a carline having angles projecting therefrom in line with said purlins to support said section.

11. A car having an opening in its roof and a removable hatch consisting of carlines, purlins and metallic covering, a running board and a truss for said hatch.

12. A car having an opening in its roof and a hatch for closing said opening comprising a truss rod extending diagonally from corner to corner of said hatch.

13. In a box car, a roof having an opening therein and a side plate increased in depth and flanged laterally adjacent said opening.

14. In a box car, a roof having an opening therein, a wall having an opening therein adjacent the opening in the roof and a side plate increased in depth and flanged laterally adjacent said roof opening and above said wall opening.

15. A car wall having an opening therein, a side plate section having its end adjacent said opening and a lintel forming an extension of said side plate in line therewith across said opening.

16. In a car having a wall with an opening, side plate sections having their ends adjacent said opening and a lintel connecting the ends of said sections and forming with said sections a continuous side plate.

17. A car having an opening in its roof, a hatch for closing said opening and crossed diagonal truss rods for bracing said hatch.

The foregoing specification signed at McKees Rocks, Allegheny county, Pennsylvania, this twenty-fourth day of February, 1908.

MINOT C. BLEST.

Witnesses:
T. J. JONES,
G. C. LAMBE.